(12) United States Patent
Eckel et al.

(10) Patent No.: US 8,349,926 B2
(45) Date of Patent: *Jan. 8, 2013

(54) SCRATCH-RESISTANT, IMPACT-RESISTANT POLYCARBONATE MOULDING COMPOSITIONS WITH GOOD MECHANICAL PROPERTIES

(75) Inventors: Thomas Eckel, Dormagen (DE); Vera Taschner, Köln (DE); Achim Feldermann, Düsseldorf (DE); Burkhard Thuermer, Bornheim (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,024

(22) Filed: Dec. 16, 2010

(65) Prior Publication Data
US 2011/0152417 A1 Jun. 23, 2011

(30) Foreign Application Priority Data
Dec. 18, 2009 (DE) .................. 10 2009 059 076

(51) Int. Cl.
*C08G 18/77* (2006.01)
(52) U.S. Cl. ............ 524/115; 524/127; 524/80; 524/430
(58) Field of Classification Search .................. 524/115
See application file for complete search history.

(56) References Cited

U.S. PATENT DOCUMENTS

| | | | |
|---|---|---|---|
| 4,243,575 A | 1/1981 | Myers et al. | |
| 5,153,251 A | 10/1992 | Lupinski et al. | |
| 6,562,887 B1 * | 5/2003 | Kurasawa et al. | 524/269 |
| 7,250,127 B2 * | 7/2007 | Geck et al. | 264/142 |
| 2008/0132618 A1 | 6/2008 | Eckel et al. | |

FOREIGN PATENT DOCUMENTS

| | | |
|---|---|---|
| EP | 0 391 413 | 10/1990 |
| JP | 1-104637 | 4/1989 |
| JP | 2-87478 | 3/1990 |
| JP | 05 70653 | 3/1993 |
| JP | 2003-326623 | 11/2003 |

OTHER PUBLICATIONS

International Search Report of PCT/EP2010/069831 dated Mar. 16, 2011.
Written Opinion of PCT/EP2010/069831.

* cited by examiner

*Primary Examiner* — Doris Lee
(74) *Attorney, Agent, or Firm* — Baker Donelson Bearman Caldwell & Berkowitz

(57) ABSTRACT

The present invention relates to scratch-resistant, impact-resistant polycarbonate (PC) compositions and moulding compositions which have good mechanical properties and a high resistance to chemicals coupled with good flameproofing properties, and show improved flow properties during processing. The present invention furthermore relates to a process for the preparation of the compositions and their use for the production of shaped articles, in particular housings of flat screen apparatuses.

18 Claims, No Drawings

SCRATCH-RESISTANT, IMPACT-RESISTANT POLYCARBONATE MOULDING COMPOSITIONS WITH GOOD MECHANICAL PROPERTIES

CROSS REFERENCE TO RELATED APPLICATIONS

This application claims priority to German Patent Application 10 2009 059 076.5 filed Dec. 18, 2009, the content of which is incorporated herein by reference in its entirety.

BACKGROUND OF THE INVENTION

1. Field of the Invention

The present invention relates to scratch-resistant, impact-resistant polycarbonate (PC) compositions and moulding compositions which have good mechanical properties and a high resistance to chemicals coupled with good flameproofing properties, and show improved flow properties during processing, a process for their preparation and their use for the production of shaped articles, in particular housings of flat screen apparatuses.

2. Description of Related Art

JP-A 05-070653 describes glass hollow spheres with a high compressive strength as an additive in maleimide-modified ABS moulding compositions. The moulding compositions have a reduced density, a high flexural modulus and a good heat distortion temperature. Nothing is reported on favourable effects of this additive on weld strength, resistance to chemicals or an increased scratch resistance.

EP-A 391 413 describes the use of talc as a filler in impact-modified polycarbonate. An influence on the scratch resistance or the processing properties is not described.

JP-A 01-104637 describes mixtures of crystalline polypropylene and modified polypropylene, to which hollow particles of Al2O3-SiO2 have been added. Compared with a corresponding mixture with talc, an improved scratch resistance coupled with a reduced flexural modulus was obtained by these particles. No effects on the weld strength or the resistance to chemicals are described.

JP 2003-326623 describes multilayered sheets of polycarbonate in which an intermediate layer is equipped with hollow ceramic spheres for insulation against heat and sound. However, the spheres are not present in a blend with polycarbonate.

EP 2087478 A1 describes impact-modified polycarbonate compositions which have filler content and have increased requirements on mechanical properties and improved flow properties, which are obtained by addition of hollow ceramic spheres. However, no positive effects on impact strength and weld strength are achieved.

SUMMARY OF THE INVENTION

An object of the present invention is to provide a composition which is distinguished by a high flowability (measured as melt viscosity), good mechanical properties under rapid impact stress, such as a high impact strength and high weld strength, and by a good resistance to chemicals (ESC properties) with an unchanged high or better scratch resistance. The compositions should preferably be flame-resistant and meet the requirements of UL94 with V-0 including at thin wall thicknesses (i.e. a wall thickness of 1.5 mm).

The invention likewise provides processes for the preparation of the compositions and the use of the compositions for the production of shaped articles.

The compositions according to the invention can be used for the production of all types of shaped articles. These can be produced for example, by injection moulding, extrusion and blow moulding processes. A further form of processing is the production of shaped articles by thermoforming from previously produced sheets or films.

Examples of such shaped articles include films, profiles, housing components of all types, e.g. for domestic appliances, such as juice presses, coffee machines, mixers; for office machines, such as monitors, flat screens, notebooks, printers, copiers; sheets, tubes, electrical installation conduits, windows, doors and further profiles for the building sector (interior finishing and exterior uses) and electrical and electronic components, such as switches, plugs and sockets, and vehicle body or interior components for utility vehicles, in particular for the automobile sector.

The compositions according to the invention can also be used in particular, for example, for the production of the following shaped articles or mouldings: interior finishing components for rail vehicles, ships, aircraft, buses and other motor vehicles, housing of electrical equipment containing small transformers, housing for equipment for processing and transmission of information, housing and lining of medical equipment, massage equipment and housing therefor, toy vehicles for children, planar wall elements, housing for safety equipment, thermally insulated transportation containers, mouldings for sanitary and bath fittings, cover grids for ventilator openings and housing for garden equipment.

It has been found, surprisingly, that compositions comprising

A) 10-90 parts by wt., preferably 50-85 parts by wt., particularly preferably 60-75 parts by wt. of aromatic polycarbonate and/or aromatic polyester carbonate, B) 0.5-30.0 parts by wt., preferably 1.0-25.0 parts by wt., more preferably 2.0-20.0 parts by wt., particularly preferably 4.0-9.0 parts by wt. of rubber-modified graft polymer, C) 0-40.0 parts by wt., preferably 1.0-30.0 parts by wt., particularly preferably 1.5-10.0 parts by wt. of vinyl (co) polymer (C.1) and/or polyalkylene terephthalate (C.2), D) 0.1-50.0 parts by wt., preferably 0.3-30.0 parts by wt., more preferably 1.0-20.0 parts by wt., particularly preferably 2.0-12.0 parts by wt. of hollow ceramic spheres, E) 0.2-10.0 parts by wt., preferably 0.5-5.0 parts by wt., more preferably 0.8-3.0 parts by wt. and particularly preferably 1.0-2.0 parts by wt. of at least one, preferably linear polyorganosiloxane, F) 0-20 parts by wt., preferably 1.0-18.0 parts by wt., more preferably 2.0-16.0 parts by wt., particularly preferably 3.0-15.0 parts by wt. of at least one phosphorus-containing flameproofing agent, G) 0-10.0 parts by wt., preferably 0.5-8.0 parts by wt., particularly preferably 1.0-6.0 parts by wt. of additives, wherein all the parts by weight stated in the present application are standardized such that the sum of the parts by weight of all the components A+B+C+D+E+F+G in the composition is 100, in some embodiments, have the desired profile of properties.

DETAILED DESCRIPTION OF A PREFERRED EMBODIMENT

In a preferred embodiment, the ratio of component D to component E is 2:1 to 10:1, preferably 4:1 to 6:1 and particularly preferably 5:1.

Component A

Aromatic polycarbonates and/or aromatic polyester carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 007 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

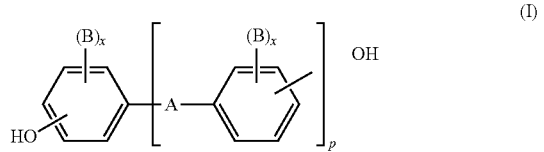

wherein
A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing hetero atoms can be fused, or a radical of the formula (II) or (III)

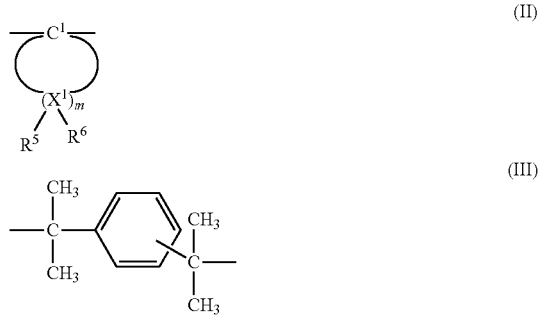

B is in each case $C_1$ to $C_{12}$-alkyl, preferably methyl, halogen, preferably chlorine and/or bromine,
x is in each case independently of each other 0, 1 or 2,
P is 1 or 0, and
$R^5$ and $R^6$ can be chosen individually for each $X^1$ and independently of each other denote hydrogen or $C_1$ to $C_6$-alkyl, preferably hydrogen, methyl or ethyl,
$X^1$ denotes carbon and
m denotes an integer from 4 to 7, preferably 4 or 5, with the proviso that on at least one atom $X^1$ $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol-A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be employed individually or as any desired mixtures. The diphenols are known from the literature or obtainable by processes known from the literature.

Chain terminators which are suitable for the preparation of the thermoplastic aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethyl-heptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic aromatic polycarbonates have average molecular weights (weight-average Mw, measured by GPC (gel permeation chromatography) with a polycarbonate standard) of from 10,000 to 200,000 g/mol, preferably 15,000 to 80,000 g/mol, particularly preferably 24,000 to 32,000 g/mol.

The thermoplastic aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups. Preferably, linear polycarbonates, more preferably based on bisphenol A, are employed.

Both homopolycarbonates and copolycarbonates are suitable. 1 to 25 wt. %, preferably 2.5 to 25 wt. %, based on the total amount of diphenols to be employed, of polydiorganosiloxanes having hydroxyaryloxy end groups can also be employed for the preparation of the copolycarbonates according to the invention according to component A. These are known (U.S. Pat. No. 3,419,634) and can be prepared by processes known from the literature. Copolycarbonates containing polydiorganosiloxane are likewise suitable; the preparation of copolycarbonates containing polydiorganosiloxane is described in DE-A 3 334 782.

Preferred polycarbonates are, in addition to bisphenol A homopolycarbonates, copolycarbonates of bisphenol A with up to 15 mol %, based on the sum of the moles of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by C1 to C22-alkyl groups or by halogen atoms, and aliphatic C2 to C22-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

One or more aromatic hydroxycarboxylic acids can additionally be employed in the preparation of aromatic polyester carbonates.

The aromatic polyester carbonates can be either linear or branched in a known manner (in this context see DE-A 2 940 024 and DE-A 3 007 934), linear polyester carbonates being preferred.

Branching agents which can be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol %, based on the diphenols employed. Phenolic branching agents can be initially introduced with the diphenols; acid chloride branching agents can be introduced together with the acid dichlorides.

The content of carbonate structural units in the thermoplastic aromatic polyester carbonates can vary as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The thermoplastic aromatic polycarbonates and polyester carbonates can be employed by themselves or in any desired mixture.

Component B

Component B includes one or more graft polymers of

B.1 5 to 95, preferably 20 to 90 wt. %, particularly preferably 30 to 60 wt. % of at least one vinyl monomer on B.2 95 to 5, preferably 80 to 10 wt. %, particularly preferably 70 to 40 wt. % of one or more graft bases with glass transition temperatures of <10° C., preferably <0° C., particularly preferably <−20° C.

The graft base B.2 in general has an average particle size ($d_{50}$ value) of from 0.05 to 10.00 μm, preferably 0.10 to 5.00 μm, more preferably 0.20 to 1.00 μm and particularly preferably from 0.25 to 0.50 μm.

Monomers B.1 are mixtures of

B.1.1 50 to 99 parts by wt. of vinylaromatics and/or vinylaromatics substituted on the nucleus (such as styrene, α-methylstyrene, p-methylstyrene, p-chlorostyrene) and/or (meth)acrylic acid ($C_1$-$C_8$)-alkyl esters (such as methyl methacrylate, ethyl methacrylate) and B.1.2 1 to 50 parts by wt. of vinyl cyanides (unsaturated nitriles, such as acrylonitrile and methacrylonitrile) and/or (meth)acrylic acid ($C_1$-$C_8$)-alkyl esters, such as methyl methacrylate, n-butyl acrylate, t-butyl acrylate, and/or derivatives (such as anhydrides and imides) of unsaturated carboxylic acids, for example maleic anhydride.

Preferred monomers B.1.1 are chosen from at least one of the monomers styrene, α-methylstyrene and methyl methacrylate, and preferred monomers B.1.2 are chosen from at least one of the monomers acrylonitrile, maleic anhydride and methyl methacrylate. Particularly preferred monomers are B.1.1 styrene and B.1.2 acrylonitrile.

Graft bases B.2 which are suitable for the graft polymers B are, for example, diene rubbers, EP(D)M rubbers, that is to say those based on ethylene/propylene and optionally diene, and acrylate, polyurethane, silicone, chloroprene and ethylene/vinyl acetate rubbers.

Preferred graft bases B.2 are diene rubbers, for example based on butadiene and isoprene, or mixtures of diene rubbers or copolymers of diene rubbers or mixtures thereof with further copolymerizable monomers (e.g. according to B.1.1 and B.1.2), with the proviso that the glass transition temperature of component B.2 is below <10° C., preferably <0° C., particularly preferably <−10° C. Pure polybutadiene rubber is particularly preferred.

The glass transition temperature is determined by means of dynamic differential scanning calorimetry (DSC) in accordance with DIN EN 61006 at a heating rate of 10 K/min with determination of the Tg as a midpoint determination (tangent method)

Particularly preferred polymers B are, for example, ABS polymers (emulsion, bulk and suspension ABS) such as are described e.g. in DE-OS 2 035 390 (=U.S. Pat. No. 3,644,574) or in DE-OS 2 248 242 (=GB 1 409 275) and in Ullmanns, Enzyklopädie der Technischen Chemie, vol. 19 (1980), p. 280 et seq. The gel content of the graft base B.2 is at least 30 wt. %, preferably at least 40 wt. % (measured in toluene).

The graft copolymers B are prepared by free radical polymerization, e.g. by emulsion, suspension, solution or bulk polymerization, preferably by emulsion or bulk polymerization.

Particularly suitable graft rubbers are also ABS polymers which are prepared in the emulsion polymerization process by redox initiation with an initiator system of organic hydroperoxide and ascorbic acid in accordance with U.S. Pat. No. 4,937,285.

Since as is known the grafting monomers are not necessarily grafted completely on to the graft base during the grafting reaction, according to the invention graft polymers B are also understood as meaning those products which are produced by (co)polymerization of the grafting monomers in the presence of the graft base and are also obtained during the working up.

Suitable acrylate rubbers according to B.2 of the polymers B are preferably polymers of acrylic acid alkyl esters, optionally with up to 40 wt. %, based on B.2, of other polymerizable ethylenically unsaturated monomers. The preferred polymerizable acrylic acid esters include C1 to C8-alkyl esters, for example methyl, ethyl, butyl, n-octyl and 2-ethylhexyl esters, haloalkyl esters, preferably halo-C1-C8-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monohydric alcohols having 3 to 12 C atoms, or of saturated polyols having 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of the crosslinking monomers is preferably 0.02 to 5.00, in particular 0.05 to 2.00 wt. %, based on the graft base B.2. In the case of cyclic crosslinking monomers having at least three ethylenically unsaturated groups, it is advantageous to limit the amount to less than 1 wt. % of the graft base B.2.

Preferred "other" polymerizable ethylenically unsaturated monomers which can optionally serve for preparation of the graft base B.2 in addition to the acrylic acid esters are e.g. acrylonitrile, styrene, α-methylstyrene, acrylamides, vinyl C1-C6-alkyl ethers, methyl methacrylate, butadiene. Preferred acrylate rubbers as the graft base B.2 are emulsion polymers which have a gel content of at least 60 wt. %.

Further suitable graft bases according to B.2 are silicone rubbers having grafting-active sites, such as are described in DE-OS 3 704 657, DE-OS 3 704 655, DE-OS 3 631 540 and DE-OS 3 631 539.

The gel content of the graft base B.2 is determined at 25° C. in a suitable solvent (M. Hoffmann, H. Krömer, R. Kuhn, Polymeranalytik I und II, Georg Thieme-Verlag, Stuttgart 1977).

The average particle size d50 is the diameter above and below which in each case 50 wt. % of the particles lie. It can be determined by means of ultracentrifuge measurement (W. Scholtan, H. Lange, Kolloid, Z. und Z. Polymere 250 (1972), 782-1796).

Component C

Component C includes one or more thermoplastic vinyl (co)polymers C.1 and/or polyalkylene terephthalates C.2.

Suitable vinyl (co)polymers C.1 are polymers of at least one monomer from the group of vinylaromatics, vinyl cyanides (unsaturated nitriles), (meth)acrylic acid (C1-C8)-alkyl esters, unsaturated carboxylic acids and derivatives (such as anhydrides and imides) of unsaturated carboxylic acids. (Co) polymers which are suitable in particular are those of C.1.1 50 to 99, preferably 60 to 80 parts by wt. of vinylaromatics and/or vinylaromatics substituted on the nucleus, such as styrene, α-methylstyrene, p-methylstyrene, p-chlorostyrene, and/or (meth)acrylic acid ($C_1$-$C_8$)-alkyl esters, such as methyl methacrylate, ethyl methacrylate, and C.1.2 1 to 50, preferably 20 to 40 parts by wt. of vinyl cyanides (unsaturated nitriles), such as acrylonitrile and methacrylonitrile, and/or (meth)acrylic acid ($C_1$-$C_8$)-alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers C.1 are resinous, thermoplastic and rubber-free. The copolymer of C.1.1 styrene and C.1.2 acrylonitrile is particularly preferred.

The (co)polymers according to C.1 are known and can be prepared by free radical polymerization, in particular by emulsion, suspension, solution or bulk polymerization. The (co)polymers preferably have average molecular weights Mw (weight-average, determined by light scattering or sedimentation) of between 15,000 and 200,000 g/mol, particularly preferably between 100,000 and 150,000 g/mol.

In a particularly preferred embodiment, C.1 is a copolymer of 77 wt. % of styrene and 23 wt. % of acrylonitrile having a weight-average molecular weight Mw of 130,000 g/mol.

The polyalkylene terephthalates of component C.2 are reaction products of aromatic dicarboxylic acids or their reactive derivatives, such as dimethyl esters or anhydrides, and aliphatic, cycloaliphatic or araliphatic diols, and mixtures of these reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 wt. %, based on the diol component, of radicals of ethylene glycol and/or butane-1,4-diol.

The preferred polyalkylene terephthalates can contain, in addition to terephthalic acid radicals, up to 20 mol %, preferably up to 10 mol % of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can contain, in addition to radicals of ethylene glycol or butane-1,4-diol, up to 20 mol %, preferably up to 10 mol % of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of 3- or 4-hydric alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates contain 1 to 50 wt. %, preferably 1 to 30 wt. % of polyethylene terephthalate and 50 to 99 wt. %, preferably 70 to 99 wt. % of polybutylene terephthalate.

The polyalkylene terephthalates preferably used in general have a limiting viscosity of from 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component D

The moulding compositions according to the invention comprise as component D hollow ceramic spheres, preferably hollow silicon-aluminium ceramic spheres. Preferred hollow ceramic spheres have a content of Al2O3 of from 5.0 to 25.0 wt. %, preferably from 7.5 to 20.0 wt. % and particularly preferably from 10.0 to 15.0 wt. %.

In a preferred embodiment, the hollow ceramic spheres have a specific density of 2.0-3.0 g/cm3, preferably 2.2-2.6 g/cm3. Particularly preferred hollow ceramic spheres have a compressive strength of 50-700 MPa, preferably 200-500 MPa. The compressive strength stated is the resistance to an isostatic pressure under which 80% of the spheres remain undamaged when they are exposed to the said pressure in a column of liquid.

The hollow ceramic spheres preferably have an average particle diameter (d50) of 0.1-100.0 μm, preferably 0.5-50.0 μm, more preferably 1.0-30.0 μm and particularly preferably of 2.0-10.0 μm. The average particle diameter ($d_{50}$ value) is determined by sedimentation in an aqueous medium using a Sedigraph 5100, Micrometrics Instruments Corporation, Norcross, Ga., USA.

Component E

Polyorganosiloxanes as component E according to the invention comprise units of the general formula IV:

$$R_rSiO_{(4-r)/2} \quad \quad (IV)$$

wherein R independently of each other denote substituted or unsubstituted hydrocarbon radicals and r denotes 0, 1, 2 or 3, with the proviso that the average numerical value of r is in a range of from 1.9 to 2.1.

Preferred radicals R are, for example, alkyl, aryl, alkylaryl, alkenyl or cycloalkyl groups, each of which can be substituted or unsubstituted and optionally interrupted by hetero atoms.

Examples of hydrocarbon radicals R are alkyl radicals, such as, for example, the methyl, ethyl, n-propyl, iso-propyl, n-butyl, iso-butyl, tert-butyl, n-pentyl, iso-pentyl, neo-pentyl, tert-pentyl radical, hexyl radicals, such as, for example, the n-hexyl radical, heptyl radicals, such as, for example, the n-heptyl radical, octyl radicals, such as the n-octyl radical and iso-octyl radicals, such as, for example, the 2,2,4-trimethylpentyl radical or ethylhexyl radical, nonyl radicals, such as, for example, the n-nonyl radical, decyl radicals, such as, for example, the n-decyl radical, dodecyl radicals, such as, for example, the n-dodecyl radical, octadecyl radicals, such as, for example, the n-octadecyl radical; cycloalkyl radicals, such as, for example, cyclopentyl, cyclohexyl, cycloheptyl and methylcyclohexyl radicals; aryl radicals, such as, for example, the phenyl, biphenyl, naphthyl and anthryl and phenanthryl radical; alkaryl radicals, such as, for example, o-, m-, p-tolyl radicals, xylyl radicals and ethylphenyl radicals; aralkyl radicals, such as, for example, the benzyl radical, the α- and the β-phenylethyl radical.

Examples of substituted hydrocarbon radicals R are halogenated alkyl radicals, such as, for example, the 3-chloropropyl, the 3,3,3-trifluoropropyl and the perfluorohexylethyl radical, halogenated aryl radicals, such as, for example, the p-chlorophenyl and the p-chlorobenzyl radical.

Preferably, the radical R is hydrogen and/or hydrocarbon radicals having 1 to 8 carbon atoms, particularly preferably methyl.

Further preferred examples of radicals R are the vinyl, allyl, methallyl, 1-propenyl, 1-butenyl, 1-pentenyl radical, 5-hexenyl, butadienyl, hexadienyl, cyclopentenyl, cyclopentadienyl, cyclohexenyl, ethynyl, propargyl and 1-propynyl radical.

In a further preferred embodiment according to the invention, the radical R is alkenyl radicals having 2 to 8 carbon atoms, particularly preferably the vinyl radical.

In the case of optionally substituted hydrocarbon radicals having 1 to 8 carbon atoms, the methyl, vinyl, phenyl and 3,3,3-trifluoropropyl radical are particularly preferred as substituents.

Preferably, alkyl radicals, in particular methyl radicals, are bonded to at least 70 mol % of the Si atoms contained in the polyorganosiloxane E of units of the formula (IV).

If the polyorganosiloxanes also contain, in addition to methyl or 3,3,3-trifluoropropyl radicals bonded to silicon and a combination of the two, vinyl or phenyl radicals bonded to silicon and a combination of the two, the latter are preferably present in amounts of from 0.001 o 30 mol %.

Preferably, the polyorganosiloxanes E predominantly comprise diorganosiloxane units. The end groups of the polyorganosiloxanes can be trialkylsiloxy groups, in particular the trimethylsiloxy radical or the dimethylvinylsiloxy radical; however, one or more of these alkyl groups can also be replaced by hydroxyl groups or alkoxy groups, such as methoxy or ethoxy radicals.

The polyorganosiloxanes E can be liquids or highly viscous substances. The polyorganosiloxanes E have a viscosity, measured at 25° C., of between 50,000 and 1,000,000 mm2/s, preferably between 100,000 and 800,000 mm2/s, in particular between 200,000 and 600,000 mm2/s, very particularly preferably of 500,000 mm2/s, with the proviso that the average molecular weight of component E is less than 200,000 g/mol.

One polyorganosiloxane or a mixture of various polyorganosiloxanes can be employed as component E.

Preferably, no crosslinking agents are employed in the organopolysiloxane granules according to the invention.

For certain uses, however, it may be advantageous for crosslinking agents to be employed, for example if binding of the organopolysiloxane to the thermoplasts is desirable. In this case, peroxides, such as dibenzoyl peroxide, bis(2,4-dichlorobenzoyl) peroxide, dicumyl peroxide bis-4-methylbenzoyl peroxide, 2,5-dimethyl-hexane-2,5-di-tert-butyl peroxide or 2,5-bis-(tert-butylperoxy)-2,5-dimethylhexane and mixtures thereof, are preferably added to the polyorganosiloxane granules according to the invention as crosslinking agents.

Preferably, linear polydimethylsiloxanes having a viscosity of 500,000 mm2/s, measured at 25° C., are employed in the present invention.

Component F

Phosphorus-containing flameproofing agents F in the context according to the invention are preferably chosen from the groups of mono- and oligomeric phosphoric and phosphonic acid esters, phosphonatamines and phosphazenes, it also being possible to employ mixtures of several components chosen from one or various of these groups as the flameproofing agent. Other halogen-free phosphorus compounds not mentioned specifically here can also be employed by themselves or in any desired combination with other halogen-free phosphorus compounds.

Preferred mono- and oligomeric phosphoric or phosphonic acid esters are phosphorus compounds of the general formula (V)

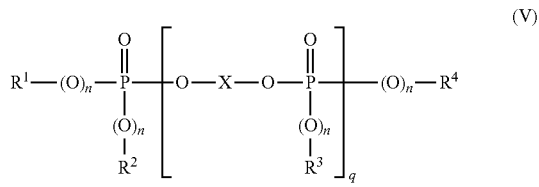

wherein
R$^1$, R$^2$, R$^3$ and R$^4$ independently of each other denote in each case optionally halogenated C$_1$ to C$_8$-alkyl, or C$_5$ to C$_6$-cycloalkyl, C$_6$ to C$_{20}$-aryl or C$_7$ to C$_{12}$-aralkyl in each case optionally substituted by alkyl, preferably C$_1$ to C$_4$-alkyl, and/or halogen, preferably chlorine, bromine,
n independently of each other denote 0 or 1,
q denotes 0 to 30 and
X denotes a mono- or polynuclear aromatic radical having 6 to 30 C atoms, or a linear or branched aliphatic radical having 2 to 30 C atoms, which can be substituted by OH and can contain up to 8 ether bonds.

Preferably, R1, R2, R3 and R4 independently of each other represent C1 to C4-alkyl, phenyl, naphthyl or phenyl-C1-C4-alkyl. The aromatic groups R1, R2, R3 and R4 can in their turn be substituted by halogen groups and/or alkyl groups, preferably chorine, bromine and/or C1 to C4-alkyl. Particularly preferred aryl radicals are cresyl, phenyl, xylenyl, propylphenyl or butylphenyl and the corresponding brominated and chlorinated derivatives thereof.

X in the formula (V) preferably denotes a mono- or polynuclear aromatic radical having 6 to 30 C atoms. This is preferably derived from diphenols of the formula (I).
n in the formula (V) can be, independently of each other, 0 or 1, and preferably n is 1.
q represents integral values from 0 to 30, preferably 0 to 20, particularly preferably 0 to 10, in the case of mixtures average values from 0.8 to 5.0, preferably 1.0 to 3.0, more preferably 1.05 to 2.00 and particularly preferably from 1.08 to 1.60.

X particularly preferably represents

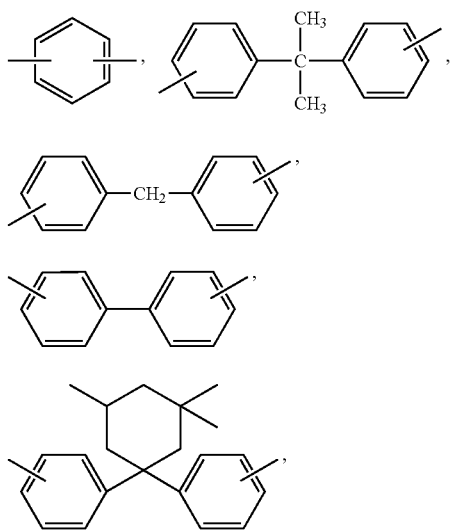

or chlorinated or brominated derivatives thereof, and in particular X is derived from resorcinol, hydroquinone, bisphenol A or diphenylphenol. Particularly preferably, X is derived from bisphenol A.

Phosphorus compounds of the formula (V) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, resorcinol-bridged oligophosphate and bisphenol A-bridged oligophosphate. The use of oligomeric phosphoric acid esters of the formula (V) which are derived from bisphenol A is particularly preferred.

Bisphenol A-based oligophosphate according to formula (Va)

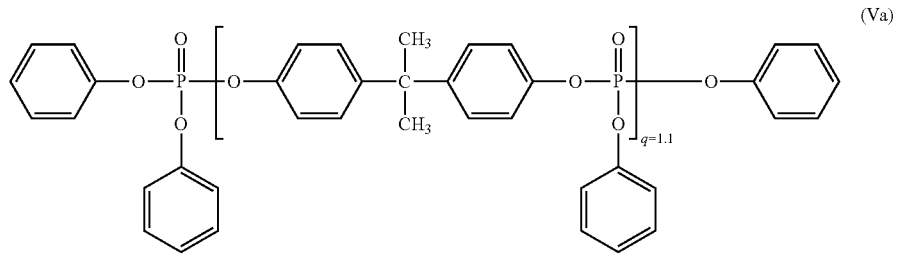

is most preferred as component F.

The phosphorus compounds according to component F are known (cf. e.g. EP-A 0 363 608, EP-A 0 640 655) or can be prepared by known methods in an analogous manner (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

Mixtures of phosphates of different chemical structure and/or of the same chemical structure and different molecular weight can also be employed as component F according to the invention.

Preferably, mixtures of the same structure and different chain length are used, the q value stated being the average q value. The average q value can be determined by determining the composition of the phosphorus compound (molecular weight distribution) by means of a suitable method (gas chromatography (GC), high pressure liquid chromatography (HPLC), gel permeation chromatography (GPC)) and calculating the mean values for q therefrom.

Phosphonatamines and phosphazenes such as are described in WO 00/00541 and WO 01/18105 can furthermore be employed as flameproofing agents.

The flameproofing agents can be employed by themselves or in any desired mixture with one another or in a mixture with other flameproofing agents.

Further Additives G

The composition can comprise further conventional polymer additives, such as flameproofing synergists, antidripping agents (for example compounds of the substance classes of fluorinated polyolefins, of silicones and aramid fibres), lubricants and mould release agents (for example pentaerythritol tetrastearate), nucleating agents, stabilizers, antistatics (for example conductive carbon blacks, carbon fibres, carbon nanotubes and organic antistatics, such as polyalkylene ethers, alkylsulfonates or polyamide-containing polymers) and dyestuffs, pigments, fillers and reinforcing substances, in particular glass fibres, mineral reinforcing substances and carbon fibres.

In particular, polytetrafluoroethylene (PTFE) or PTFE-containing compositions, such as, for example, masterbatches of PTFE with polymers or copolymers containing styrene or methyl methacrylate, are employed as antidripping agents. Sterically hindered phenols and phosphites or mixtures thereof, such as, for example, Irganox© B900 (Ciba Speciality Chemicals), are preferably used as stabilizers. Pentaerythritol tetrastearate is preferably used as a mould release agent.

Preparation and Testing of the Moulding Compositions

A suitable method for preparing a composition of the present invention is described below.

The starting substances listed in Table 1 are compounded and granulated on a twin-screw extruder (ZSK-25) (Werner and Pfleiderer) at a speed of rotation of 225 rpm and a throughput of 20 kg/h at a machine temperature of 260° C. The finished granules are processed on an injection moulding machine to give the corresponding test specimens (melt temperature 240° C., mould temperature 80° C., melt front speed 240 mm/s).

The following methods were used for characterization of the properties of the test specimens:

The flowability was determined in accordance with ISO 11443 (melt viscosity).

The weld strength was measured in accordance with ISO 179/1eU on a test bar of dimensions 80×10×4 mm injection moulded on both sides.

The impact strength was measured in accordance with ISO 179/1eU on a test bar of dimensions 80×10×4 mm injection moulded on one side.

The heat distortion temperature was measured in accordance with DIN ISO 306 (Vicat softening temperature, method B with a 50 N load and a heating rate of 120 K/h) on a test bar of dimensions 80×10×4 mm injection moulded on one side.

The scratch resistance was determined in accordance with ASTM D-3363 (750 g weight) as the pencil hardness. In this test, pencils of hardness 3H, 2H, H, F, HB, B, 2B and 3B (decreasing hardness here) are guided over the surface under a fixed pressure. The pencil hardness indicates the hardest pencil with which no scratch is detectable on the surface.

The stress cracking properties (ESC properties) are investigated on bars of dimensions 80×10×4 mm. The particular test medium used is shown in Table 1. The test specimens are pre-extended by means of an arc template (pre-extension $\epsilon x=2.4\%$) and kept in the test medium at room temperature. The stress cracking properties are evaluated via the observation of crack formation ("CF") or non crack formation ("NCF") or fracture ("FR").

The burning properties are measured in accordance with UL 94V on bars of dimensions 127×12.7×1.5 mm.

The following non-limiting examples serve to explain the invention further.

EXAMPLES

Component A

Linear polycarbonate based on bisphenol A with a weight-average molecular weight M w of 27,500 g/mol (determined by GPC in methylene chloride with polycarbonate as the standard).

Component B

ABS polymer prepared by emulsion polymerization of 43 wt. % (based on the ABS polymer) of a mixture of 27 wt. % of acrylonitrile and 73 wt. % of styrene in the presence of 57 wt. % (based on the ABS polymer) of a polybutadiene rubber crosslinked in particle form (average particle diameter d50=0.35 μm).

Component C

Copolymer of 77 wt. % of styrene and 23 wt. % of acrylonitrile having a weight-average molecular weight Mw of 130,000 g/mol (determined by GPC in tetrahydrofuran with a polystyrene standard), prepared by the bulk process.

Component D

Hollow ceramic spheres made of silicon-aluminium ceramic with an Al2O3 content of 12%. The ceramic hollow spheres have a specific density of 2.5 g/cm3 and an isostatic compressive strength of 420 MPa. The spheres have an average diameter of 4 μm.

Component E

Polydimethylsiloxane, linear, viscosity 500,000 mm2/s, measured at 25° C. (molecular weight 160,000 g/mol)

Component F

Oligophosphate based on bisphenol A

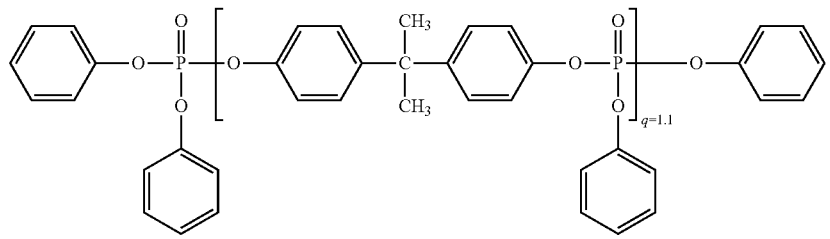

Component G

G1: Polytetrafluoroethylene powder, CFP 6000 N, Du Pont.

G2: Pentaerythritol tetrastearate as a lubricant/mould release agent

G3: Phosphite stabilizer, Irganox® B 900, Ciba Speciality Chemicals

TABLE 1

Composition and properties of the flameproofed moulding compositions

| Composition [wt. %] | 1 | 2 (comp.) | 3 (comp.) | 4 | 5 (comp.) | 6 (comp.) |
|---|---|---|---|---|---|---|
| A | 68.1 | 69.1 | 73.1 | 64.6 | 66.6 | 74.6 |
| B | 7.5 | 7.5 | 7.5 | 7.5 | 7.5 | 7.5 |
| C | 5.0 | 5.0 | 5.0 | 2.5 | 2.5 | 2.5 |
| D | 5.0 | 5.0 | — | 10.0 | 10.0 | — |
| E | 1.0 | — | 1.0 | 2.0 | — | 2.0 |
| F | 12.5 | 12.5 | 12.5 | 12.5 | 12.5 | 12.5 |
| G1 | 0.4 | 0.4 | 0.4 | 0.4 | 0.4 | 0.4 |
| G2 | 0.1 | 0.1 | 0.1 | 0.1 | 0.1 | 0.1 |
| G3 | 0.4 | 0.4 | 0.4 | 0.4 | 0.4 | 0.4 |
| Melt viscosity [Pas] | | | | | | |
| 1,000 s−1/260° C. | 203 | 223 | 190 | 186 | 199 | 173 |
| Weld strength anF [kJ/m$^2$] | 9.2 | 7.9 | 9.0 | 12.4 | 9.1 | 11.5 |
| Impact strength an [kJ/m$^2$] | 243 | 180 | 245 | 197 | 128 | 191 |
| Vicat B 120 [° C.] | 103 | 103 | 101 | 101 | 102 | 99 |
| UL 94 V 1.5 mm | V-0 | V-0 | V-0 | V-0 | V-0 | V-0 |
| Total after-burning time [s] | 14 | 14 | 24 | 10 | 13 | 25 |
| Scratch resistance (750 g) in acc. with ASTM D-3363 | H | H | F | 2H | H | F |
| Stress cracking resistance | | | | | | |
| 1) Hand lotion | NC | NCF | NCF | NCF | NCF | NCF |
| 2.4%/max. 168 h | 124.4 h | 101.2 h | 98.0 h | 113.4 h | 69.1 h | 87.2 h |
| 2) Rapeseed oil | FR | FR | FR | FR | FR | FR |
| 2.4%/max. 168 h | 58 min | 32 min | 40 min | 82 min | 59 min | 75 min |

Of the compositions of Table 1, the compositions according to the invention according to Examples 1 and 4 (comprising a combination of specific ceramic spheres and a linear polydimethylsiloxane) achieve an object according to the invention, i.e., they possess good scratch resistance achieve an improved resistance to stress cracking and better mechanical properties (that is to say high impact strength and weld strength) and an improved flowability. If only ceramic beads are used (Comparison Examples 2 and 5), the scratch resistance is indeed at a high level, but significant weaknesses in weld strength, impact strength and in the flow properties were seen. If only siloxanes are used (Comparison Examples 3 and 6), the weld strength and impact strength are indeed at a high level, but the scratch resistance, heat distortion temperature and resistance to stress cracking worsened significantly.

In addition to providing the compositions, the present invention also provides the use thereof for the production of injection moulded or thermoformed shaped articles and shaped articles comprising a composition according to the invention.

The invention claimed is:

1. A composition comprising
A) 10-90 parts by wt. of aromatic polycarbonate and/or aromatic polyester carbonate,
B) 0.5-30 parts by wt. of rubber-modified graft polymer,
C) 0-40 parts by wt. of vinyl (co)polymer (C.1) and/or polyalkylene terephthalate (C.2),
D) 0.1-50 parts by wt. of hollow ceramic spheres,
E) 0.2-5.0 parts by wt. of at least one polyorganosiloxane, wherein the polyorganosiloxane (E) comprises units of formula (IV)

$$R_rSiO_{(4-r)/2} \qquad (IV)$$

wherein R is selected from the group consisting of vinyl, allyl, methallyl, 1-propenyl, 1-butenyl, 1-pentenyl radical, 5-hexenyl, butadienyl, hexadienyl, cyclopentenyl, cyclopentadienyl, cyclohexenyl, ethynyl, propargyl, 1-propynyl, methyl, 3-chloropropyl, 3,3,3-trifluoropropyl, perfluorohexylethyl, p-chlorophenyl and p-chlorobenzyl radicals,
F) 0-20 parts by wt. of at least one phosphorus-containing flameproofing agent,
G) 0-10 parts by wt. of at least one further additive,
wherein all the parts by weight stated are standardized such that the sum of the parts by weight of all the components A+B+C+D+E+F+G in the composition is 100,
and wherein the impact strength of the composition is at least 197 kJ/m$^2$.

2. A composition according to claim 1, wherein the ratio of component (D) to component (E) is 2:1 to 10:1.

3. A composition according to claim 1, wherein alkyl radicals are bonded to at least 70 mol% of Si atoms in the polyorganosiloxane (E).

4. A composition according to claim 1, wherein the polyorganosiloxane (E) has a viscosity, measured at 25 ° C., of from 50,000 to 1,000,000 mm$^2$/s.

5. A composition according to claim 1, wherein the hollow ceramic sphere has an Al$_2$O$_3$ content of from 5 to 25 wt. %.

6. (Original A composition according to claim 1, wherein the hollow ceramic sphere has a compressive strength of 50-700 MPa.

7. A composition according to claim 1, wherein the hollow ceramic sphere has an average particle diameter (d$_{50}$) of 0.1-100.0 μm.

8. A composition according to claim 1, wherein the graft base of component B has an average particle size ($d_{50}$ value) of from 0.05 to 10.00 μm.

9. A composition according to claim 1, wherein the graft base of component B is selected from the group consisting of diene rubbers, EP(D)M rubbers, acrylate, polyurethane, silicone, chloroprene and ethylene/vinyl acetate rubbers.

10. A composition according to claim 1, wherein the graft polymer (B) is built up from
B.1) 43 wt. % of an emulsion polymer of 27 wt. % of acrylonitrile and 73 wt. % of styrene on
B.2) 57 wt. % of a polybutadiene rubber crosslinked in particle form having an average particle diameter $d_{50}$ of 0.35 μm.

11. A composition according to claim 1, wherein the phosphorus-containing flameproofing agent (D) is a flameproofing agent of formula (V)

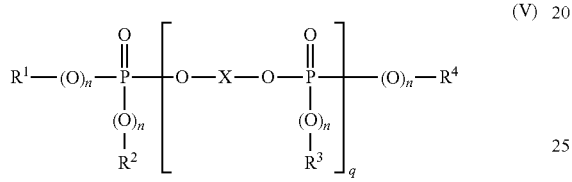

wherein
$R^1$, $R^2$, $R^3$ and $R^4$ independently of each other denote in each case optionally halogenated
$C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, and/or halogen,
n independently of each other denote 0 or 1
q denotes 0.80 to 5.00 and
X denotes a mono- or polynuclear aromatic radical having 6 to 30 C atoms, or a linear or branched aliphatic radical having 2 to 30 C atoms, which can be substituted by OH and can contain up to 8 ether bonds.

12. A composition according to claim 1, comprising as component G at least one additive selected from the group consisting of flameproofing synergists, antidripping agents, lubricants and mould release agents, nucleating agents, stabilizers, antistatics, dyestuffs, pigments and fillers and reinforcing substances.

13. A composition according to claim 1 adapted for the production of injection moulded and/or thermoformed shaped articles.

14. A composition according to claim 1, wherein the polyorganosiloxane (E) has a viscosity, measured at 25° C., of from 200,000 to 600,000 mm²/s, with the proviso that the average molecular weight of component E is less than 200,000 g/mol.

15. A composition according to claim 1, comprising
A) 50-85 parts by wt. of aromatic polycarbonate and/or aromatic polyester carbonate,
B) 1.0-25.0 parts by wt. of rubber-modified graft polymer,
C) 1.0-30.0 parts by wt. of vinyl (co)polymer (C.1) and/or polyalkylene terephthalate (C.2),
D) 0.3 to 30.0 parts by wt. of hollow ceramic spheres,
E) 0.5 to 5.0 parts by wt. of at least one polyorganosiloxane,
F) 1.0-18.0 parts by wt. of at least one phosphorus-containing flameproofing agent,
G) 0.5-8.0 parts by wt. of at least one further additive,
wherein all the parts by weight stated are standardized such that the sum of the parts by weight of all the components A+B+C+D+E+F+G in the composition is 100.

16. A composition according to claim 1, comprising
A) 60-75 parts by wt. of aromatic polycarbonate and/or aromatic polyester carbonate,
B) 4.0-9.0 parts by wt. of rubber-modified graft polymer,
C) 1.5-10 parts by wt. of vinyl (co)polymer (C.1) and/or polyalkylene terephthalate (C.2),
D) 2.0-12.0 parts by wt. of hollow ceramic spheres,
E) 1.0-2.0 parts by wt. of at least one polyorganosiloxane,
F) 3.0-15.0 parts by wt. of at least one phosphorus-containing flameproofing agent,
G) 1.0-6.0 parts by wt. of at least one further additive,
wherein all the parts by weight stated are standardized such that the sum of the parts by weight of all the components A+B+C+D+E+F+G in the composition is 100.

17. A composition according to claim 1, wherein component B is at least one graft polymer of
B.1 5 to 95 wt.% of at least one vinyl monomer on
B.2 95 to 5 wt.% of at least one graft base with glass transition temperature of <10° C., selected from the group consisting of diene rubbers, EP(D)M rubbers, acrylate, polyurethane, silicone, chloroprene, and ethylene/vinyl acetate rubbers.

18. A composition according to claim 17, wherein component B.1 is mixture of
B.1.1 50 to 99 parts by wt. of at least one monomer selected from the group consisting of styrene, α-methylstyrene, and methyl methacrylate, and
B.1.2 1 to 50 parts by wt. of at least one monomer selected from the group consisting of acrylonitrile, maleic anhydride, and methyl methacrylate.

* * * * *